Jan. 21, 1969
A. M. VEZIN
3,423,671
BOREHOLE APPARATUS FOR INVESTIGATING SUBSURFACE EARTH FORMATIONS
INCLUDING A PLURALITY OF PAD MEMBERS AND MEANS FOR
REGULATING THE BEARING PRESSURE THEREOF
Filed Aug. 27, 1962
Sheet 1 of 4
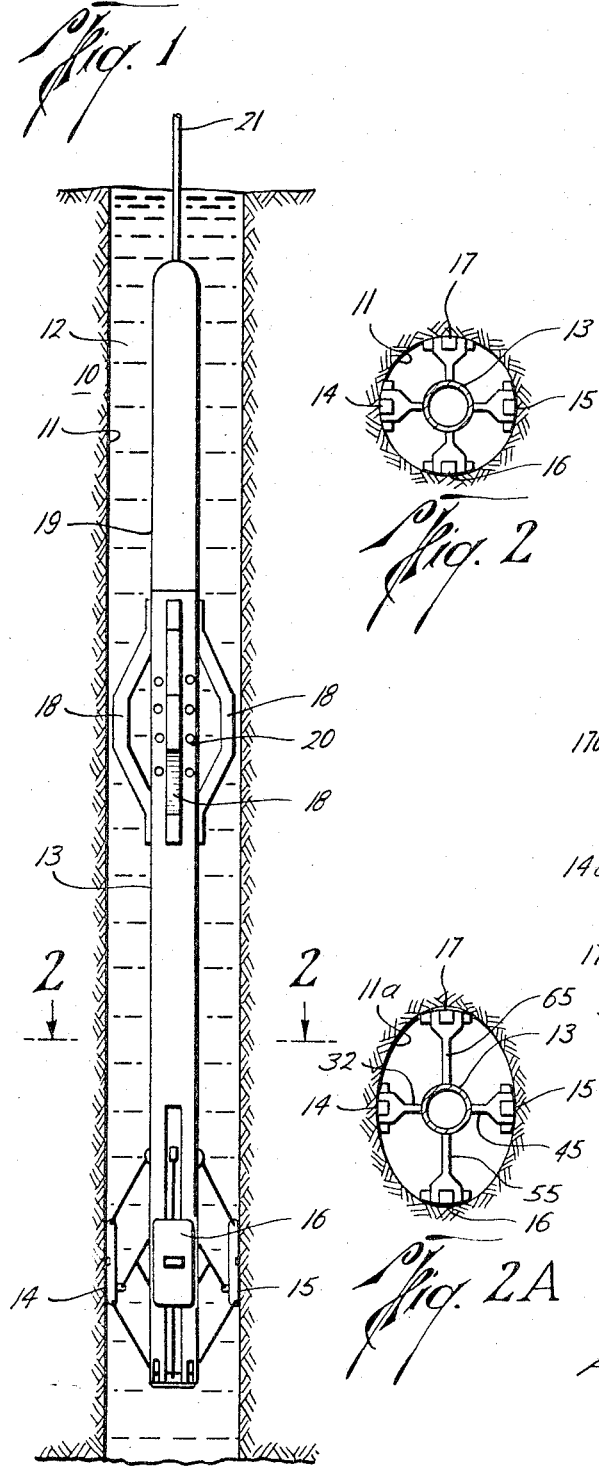
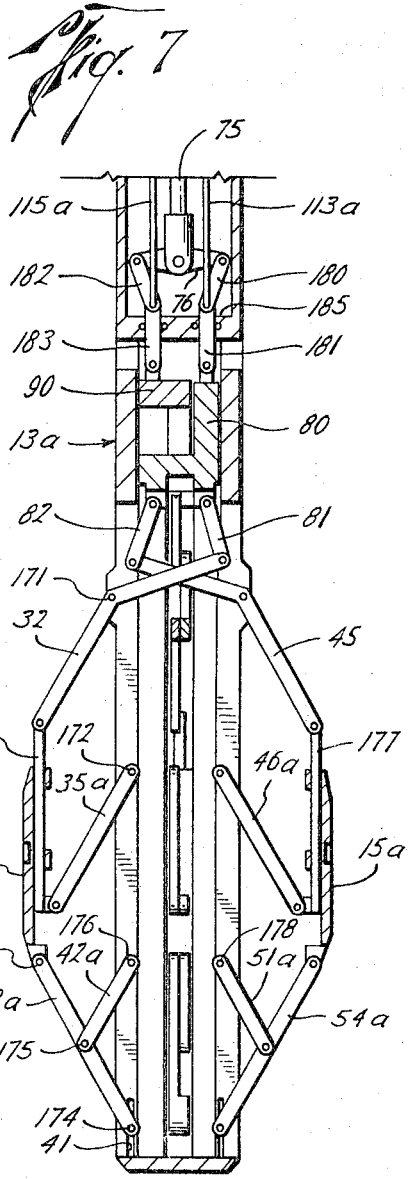
Andre Marcel Vezin
INVENTOR.
BY Richard E. Bee
ATTORNEY

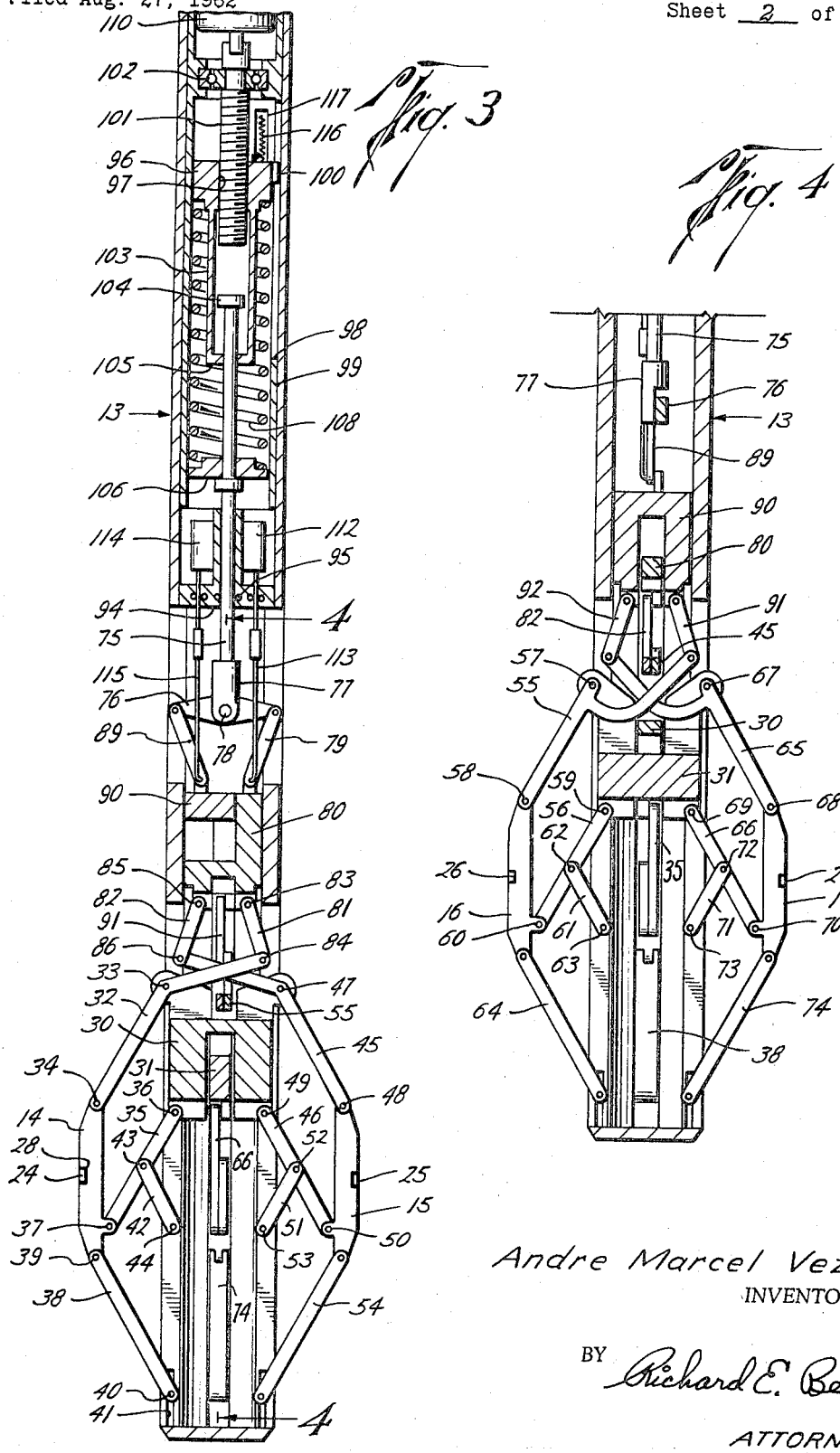

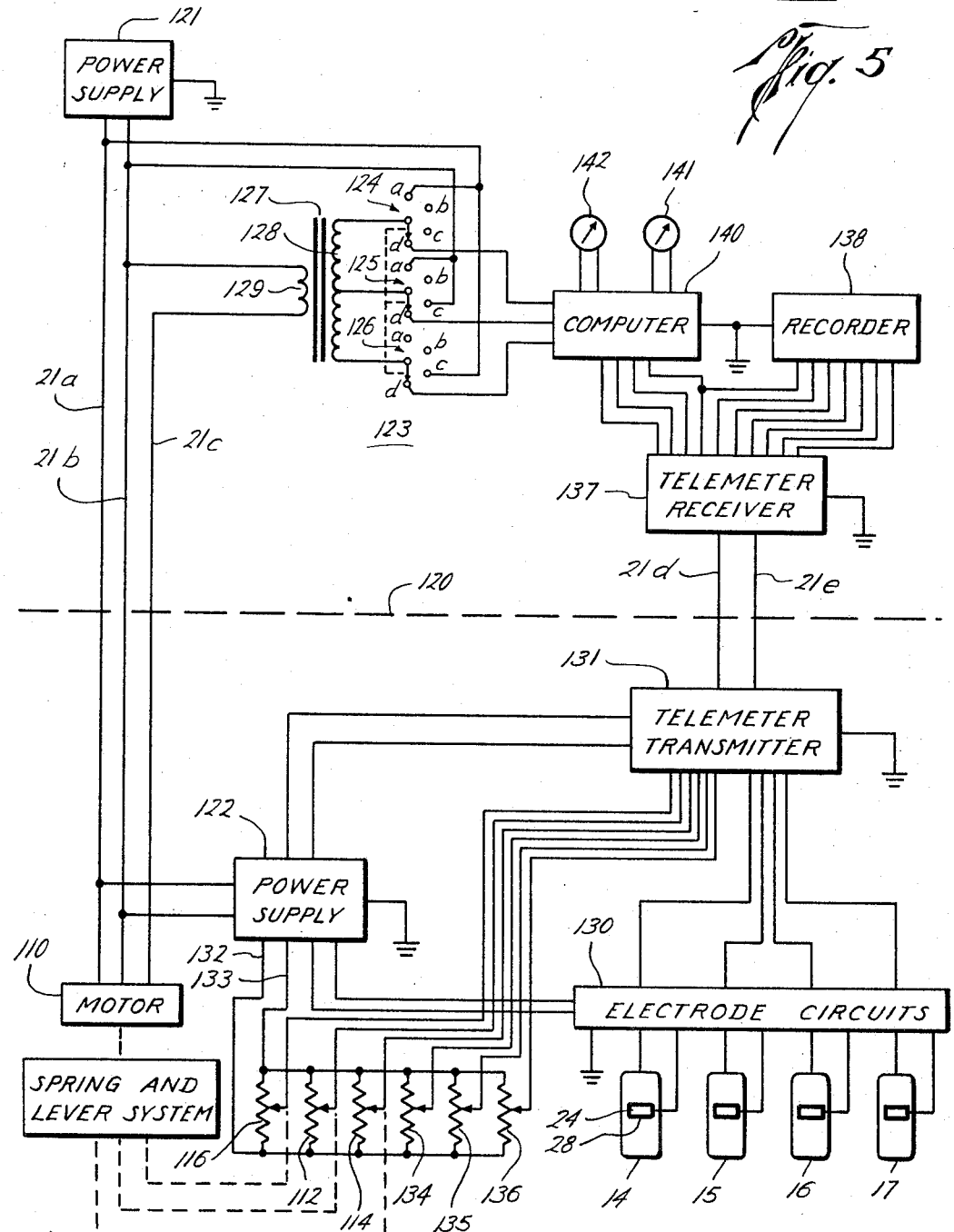

United States Patent Office 3,423,671
Patented Jan. 21, 1969

3,423,671
BOREHOLE APPARATUS FOR INVESTIGATING SUBSURFACE EARTH FORMATIONS INCLUDING A PLURALITY OF PAD MEMBERS AND MEANS FOR REGULATING THE BEARING PRESSURE THEREOF
André Marcel Vezin, Viroflay, Yvelines, France, assignor to Societe de Prospection Electrique Schlumberger, S.A., Paris, France, a corporation of France
Filed Aug. 27, 1962, Ser. No. 219,619
Claims priority, application France, Aug. 31, 1961, 872,193
U.S. Cl. 324—1      21 Claims
Int. Cl. G01v 3/00

This invention relates to apparatus for investigating earth formations and, particularly, to investigating apparatus adapted to be moved through a borehole which has been drilled into subsurface earth formations.

In the search for subsurface hydrocarbon deposits (oil, gas, etc.), it is a common practice to drill a borehole into the earth at a promising geographical location and then to lower various types of investigating devices into the borehole for measuring various properties of the subsurface earth formations adjacent the borehole. These measurements enable the determination of the presence and depth of any hydrocarbon-bearing zones. They also provide information as to the physical characteristics and lithology of the subsurface formations. Even if no hydrocarbons are discovered, this information is frequently valuable as an aid in determining where to drill the next borehole.

In order to obtain the desired subsurface measurements, it is frequently necessary that the device which is making the measurement be pressed rather firmly against the side wall of the borehole at the same time that the apparatus as a whole is being moved vertically or longitudinally through the borehole. Sometimes it is either necessary or desirable to use, at the same time, two or more measuring devices which are pressed against the borehole wall on different sides thereof. In either case, variations in the size and shape of the borehole, as well as variations in the slope or inclination of the bore hole with respect to a true vertical direction, give rise to numerous problems.

The case of a dipmeter apparatus for measuring the dip angle of the subsurface earth strata is a good example of the case where measuring devices are pressed against the bore hole wall and where problems caused by variations in borehole size, shape and inclination can be relatively serious. One form of such dipmeter apparatus which has been heretofore used includes three pad members which are symmetrically disposed around an elongated housing or support member by means of suitable arm members. In operation, the arm members act to push the pad members away from the central support member and against the borehole wall. The wall-engaging face of each pad member includes one or more electrodes which are used to measure the electrical resistivity or conductivity of the earth formation material in the immediate vicinity thereof. This provides three resistivity measurements taken on three sides of the borehole. By properly correlating the three sets of measurements which are obtained as the apparatus as a whole is moved longitudinally through the borehole, it is possible to determine the dip angles for the various subsurface earth strata. In a somewhat over-simplified sense, the greater the dip of the strata, the greater is the difference in vertical depth at which corresponding resistivity changes are indicated on the three sides of the borehole.

In order to obtain good resistivity measurements, it is necessary that the electrode-bearing face of the pad member be pressed against the side wall of the borehole with sufficient firmness to provide good electrical contact therewith. On the other hand, if the pad member is pressed too firmly against the borehole wall, other troubles will occur. Excessive pad member bearing pressure will, for example, cause a rapid wearing away of the wall-engaging face of the pad member and especially of the electrode surfaces mounted thereon. Also, since during the measurement the apparatus as a whole is usually being pulled through the borehole in an upward direction by means of a supporting cable suspended from the surface of the earth, excessive pad pressure causes sudden jumps or jerks in the movement of the investigating apparatus when passing from a narrow diameter portion of the borehole to a wider diameter portion of the borehole. Undesired speed variations of this type disturb the recording of the resistivity measurements and make them more difficult to interpret. Excessive pad pressure also places excessive strain on the supporting cable and can cause excessive stretching thereof.

In plural-pad types of investigating apparatus, such as the dipmeter apparatus just mentioned, two primary methods have been heretofore proposed for operating the different pad members relative to one another. In one method, the pad members are operated independently of one another. Independent driving forces are applied to the arm members which support the different pad members such that the different pad members can, at any given instant, be extended outwardly different distances from the body of the central support member. In the other method, the arm members for the different pad members are mechanically coupled together so that at any given instant all pad members are extended exactly the same distance from the body of the central support member. In this second method, the movements of the different arm members are dependent on one another.

The three primary factors which affect the bearing pressure of wall-engaging pad members are the diameter, the shape and the slope or inclination of the borehole. Variations in borehole diameter, for example, produce corresponding variations in the pad member bearing pressure. In particular, since the driving forces for the pad arms are usually supplied by one or more spring members, the bearing pressure increases as the diameter of the borehole decreases. Consequently, optimum bearing pressure can be provided for only one chosen value of borehole diameter. It is known, however, that the borehole diameter in any given borehole is subject to a rather wide latitude of variation since some types of formations tend to have caved-out regions, other types tend to swell up due to the absorption of the drilling fluid, while some remain more nearly true to the size of the drill bit.

Variations in the cross-sectional shape of the borehole also affect the accuracy of the measurements. Ideally, the borehole should have a circular shape or cross-section. In practice, it frequently has a more or less oval shape due to wobbling of the drill bit and the like. Also, caved-out regions will sometimes occur on one or more sides of the borehole. These variations in borehole shape are particularly troublesome in the case of dipmeter type apparatus having three symmetrically disposed pad members. This is particularly true where the pad extending arms are of the dependent type because since all pad members are extended an equal amount, it is possible in a non-circular borehole that only two of the pad members will be in contact with the borehole wall, the third pad member "floating" or remaining out of contact with the wall. In the case of pad extending arms of the independent type, all three pad members will usually be in contact with the borehole wall. In this case, however, the central support member frequently will not remain centered in the borehole. In the case of dipmeter apparatus, this off-centering of the central support member considerably complicates the interpretation and use of the dipmeter resistivity measurements. One reason for this is that the central support member also carries an inclinometer instrument for measuring the inclination of the borehole. If the support member is not properly aligned in the borehole, then the measured inclination is not the true inclination of the borehole. This type of error can be corrected for but, as stated, this considerably complicates the desired dip calculations. A further complication arises in the case of a non-circular borehole because, for the case of dipmeter measurements, it is also necessary to know the spacing or separation distance between the the various pad members and this is difficult to determine where these pad members are extended by unequal amounts, which occurs when the central support mmber is not properly centered in the borehole.

The slope or inclination of the borehole with respect to vertical also affects the operation of pad type apparatus. For an inclined borehole, some of the weight of the apparatus as a whole, especially the weight of the central support member and the elements contained therein, is added to the pad or pads located on the lower side of the borehole. For the case of dependent pad extending arms, this added weight tends to collapse the arms on the lower side of the hole. Since all arms are extended by equal amounts, this will frequently pull the upped pad member off the borehole wall, in which case the upper pad member will cease to provide any meaningful measurements. Whether or not the upper pad member loses contact with the borehole wall depends on the degress of inclination of the borehole. In the case of independent type pad extending arms, all of the pad members will usually remain in contact with the borehole wall regardless of the degree of inclination of the borehole, provided that the separation between the central support member and the borehole wall for the pad member on the upper side of the borehole does not exceed the maximum pad extension distance. For this case of independent type pad members and an inclined borehole, however, the central support member will not, in general, remain centered in the borehole. As indicated for the case of non-circular boreholes, this off-centering of the central support member considerably complicates the interpretation and use of dipmeter measurements.

It is an object of the invention, therefore, to provide new and improved apparatus for investigating subsurface earth formations traversed by a borehole.

It is another object of the invention to provide new and improved borehole investigating apparatus for more efficiently maintaining a wall-engaging member in contact with the borehole wall and which is less affected by variations in size and shape of the borehole or by any inclination of the borehole.

It is a further object of the invention to provide new and improved borehole investigating apparatus for maintaining a wall-engaging member in contact with the borehole wall with an optimum degree of bearing pressure.

It is an additional object of the invention to provide new and improved borehole investigating apparatus for simultaneously making a plurality of wall contact type measurements with greater accuracy.

It is yet another object of the invention to provide new and improved borehole investigating apparatus which provides a greater amounts of information regarding the subsurface earth formations.

It is a still futher object of the invention to provide new and improved borehole investigating apparatus which provides more accurate indications of the size and shape of the borehole.

It is another object of the invention to provide new and improved dipmeter apparatus for measuring the dip angle of subsurface earth formations.

It is a further object of the invention to provide new and improved dipmeter apparatus which provides measurements which are more reliable and more easy to interpret.

It is an additional object of the invention to provide new and improved dipmeter apparatus which provides a greater number of measurements at each level in the borehole.

In accordance with one feature of the invention, apparatus for investigating earth formations traversed by a borehole comprises an elongated support member adapted for movement through a borehole. The apparatus also includes a wall-engaging member and means for driving the wall-engaging member away from the support member and against the wall of the borehole. The apparatus further includes means for providing an indication of the bearing pressure of the wall-engaging member on the borehole wall. The apparatus additionally includes means for adjusting the driving force applied to the wall-engaging member thereby to enable regulation of the bearing pressure.

In accordance with another feature of the invention, the borehole investigating apparatus includes, in addition to an elongated support member, a first pair of wall-engaging pad members individually disposed on opposite sides of the support member along a given line. The apparatus also includes a second pair of wall-engaging pad members individually disposed on opposite sides of the support member along a given line at right angles to the given line for the first pair. The apparatus further includes first pad extending means for moving the pad members of the first pair away from the support member and against the borehold wall. The apparatus also includes second pad extending means for moving the pad members of the second pair away from the support member and against the borehole wall. The apparatus further includes primary driving means and a force dividing mechanism coupling this primary driving means to the first and second pad extending means for enabling unequal lateral extension of the pad members of the different pairs. In addition, the apparatus includes means for applying a driving force to the primary driving means.

For a better understanding of the present invention, together with other and further objects and features thereof, reference is had to the following description taken in connection with the accompanying drawings, the scope of the invention being pointed out in the appended claims.

Referring to the drawings:

FIG. 1 shows a general elevational view of a representative embodiment of horehole investigating apparatus constructed in accordance with the present invention;

FIGS. 2 and 2A are cross-sectional views taken along the section line 2—2 of FIG. 1 for boreholes having different cross-sectional shapes;

FIG. 3 is a detailed cross-sectional view of the lower portion of the FIG. 1 apparatus;

FIG. 4 is a cross-sectional view taken at right angles to the view of FIG. 3 along the section line 4—4 of FIG. 3;

FIG. 5 shows in a schematic manner a typical embodiment of electrical circuits for the apparatus of FIG. 1;

FIG. 7 is a detailed cross-sectional view of a modified embodiment of the borehole investigating apparatus.

Figure 6:
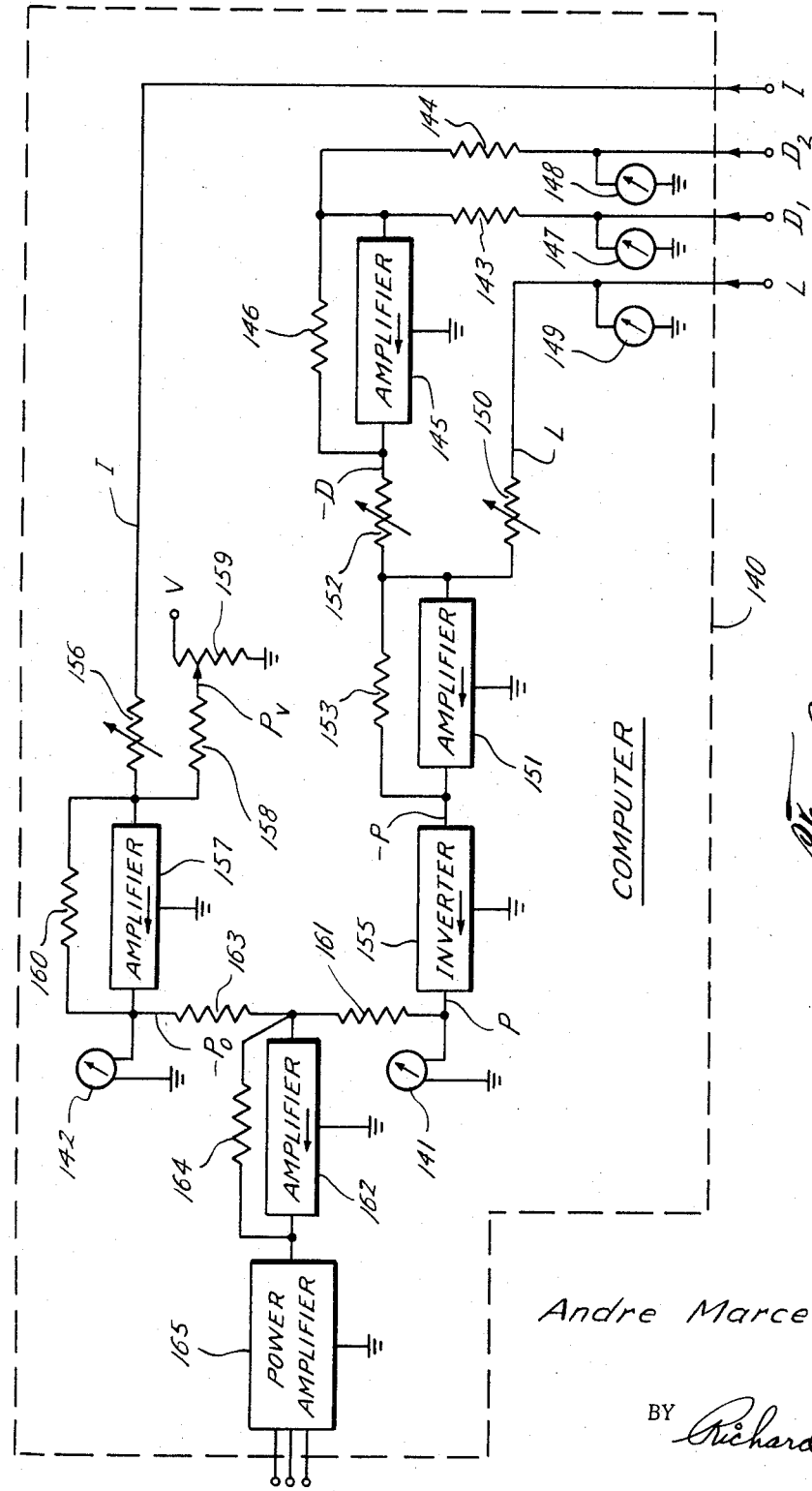
FIG. 6 is a detailed circuit diagram of a computer which is used in the FIG. 5 circuits.

Referring to FIG. 1 of the drawings, there is shown a representative embodiment of the apparatus constructed in accordance with the present invention for investigating subsurface earth formations 10 traversed by a borehole 11. The borehole 11 is filled with a conductive drilling fluid or drilling mud 12. The investigating apparatus includes an elongated support member 13 adapted for longitudinal movement through the borehole 11. By "longitudinal" movement is meant a movement parallel to the longitudinal axis of the borehole 11 which, for the case of a truly vertical borehole, would be a vertical movement. Movement at right angles to the longitudinal axis of the borehole 11 will, on the other hand, be referred to as "lateral" movement which, for a truly vertical borehole, would be a horizontal movement. Similarly, when movements and directions are taken with respect to the support member 13, "longitudinal" means parallel to the longitudinal axis of the support member 13, while "lateral" means at right angles to the longitudinal axis of support member 13.

The investigating apparatus also includes a first pair of wall-engaging pad members 14 and 15 individually disposed on opposite sides of the support member 13 along a given line. The apparatus also includes a second pair of wall-engaging pad members 16 and 17 individually disposed on opposite sides of the support member 13 along a given line at right angles to the given line for the first pair of pad members. The relationship between these two pairs of pad members is best seen in FIG. 2, which is a cross-sectional view taken along the section line 2—2 of FIG. 1.

Towards the upper end of the elongated support member 13 there is mounted a plurality of centralizer members 18. These centralizer members 18 are of a rubber-covered, metal-spring type construction. Members 18 are located at the center of gravity or, more accurately, the center of buoyancy for the case of a fluid-filled borehole, for the downhole portion of the apparatus as a whole. In this connection, the downhole apparatus also includes a fluid-tight housing 19 which is mechanically coupled to the upper end of the elongated support member 13. Such housing 19 is constructed to contain various electrical circuits and apparatus which will be mentioned hereinafter. Also located near the upper end of the elongated support member 13 is a plurality of ports 20 which serve to cooperate with a suitable pressure equalizing diaphragm located within the support member 13. The downhole apparatus as a whole, including support member 13 and fluid-tight housing 19, is suspended in the borehole 11 by means of an armored multiconductor cable 21 which is connected to a suitable drum and wench mechanism located at the surface of the earth.

Referring now to FIGS. 3 and 4 of the drawings, there are shown detailed cross-sectional views of the lower portion of the elongated support member 13 of FIG. 1. The cross-sectional view of FIG. 3 is taken in the same direction as the view of FIG. 1, while the cross-sectional view of FIG. 4 is taken at right angles to the view of FIG. 3 along the section line 4—4 thereof. As seen in FIGS. 3 and 4, each of the pad members 14, 15, 16 and 17 is constructed of metal and each includes a small metal electrode, identified by reference numerals 24, 25, 26 and 27, respectively, which is embedded in the central portion of the wall-engaging face thereof. As indicated for the case of pad member 14, for example, the small center electrode, in this case electrode 24, is insulated from the remainder of the pad member proper by a layer of electrical insulation material 28.

Considering the pad extending mechanisms for the pad members 14-17, these mechanisms include a pair of sliding members 30 and 31 mounted on the support member 13 for providing longitudinal movement with respect thereto. The sliding member 30, which cooperates with the first pair of pad members 14 and 15, is best seen in FIG. 3, while the sliding member 31, which cooperates with the second pair of pad members 16 and 17, is best seen in FIG. 4. These sliding members 30 and 31 are constructed to provide a longitudinal sliding movement with respect to one another as well as with respect to the support member 13 proper.

Considering now the first pair of pad members 14 and 15, these pad members are provided with a first set of arm members pivotally coupled thereto and to the sliding member 30 for enabling lateral movement of these pad members 14 and 15 with respect to the body of the support member 13. These arm members include a main arm member 32, in the form of a bent lever arm, which is pivotally coupled by a pin 33 to the sliding member 30 and further pivotally coupled by a pin 34 to the pad member 14. The pad member 14 also includes a secondary arm member 35 which is pivotally coupled to the sliding member 30 by pin 36 and to the pad member 14 by pin 37. The apparatus is constructed so that pivot pins 33, 34, 36 and 37 define the four corners of a parallelogram. This construction causes the wall-engaging face of the pad member 14 to remain parallel to the longitudinal axis of the support member 13 regardless of the amount of lateral extension of the pad member 14. A third arm member 38 is also provided for the pad member 14, this arm member 38 being pivotally coupled to the pad member 14 by pin 39 and pivotally coupled to the body of the support member 13 by a pin 40. Pivot pin 40 is mounted in a slot 41 at the lower end of support member 13 and, hence, is also capable of undergoing a longitudinal sliding movement.

There is also associated with the pad member 14 a linkage member 42 which serves to prevent longitudinal movement of the pad member 14 with respect to the support member 13. This linkage member 42 is pivotally coupled to the midpoint of the secondary arm member 35 by means of a pin 43. The linkage member 42 is also pivotally coupled to a fixed reference point on the body of the support member 13 by means of a pin 44. Pin 44 is located directly below pin 36 and in longitudinal alignment therewith. The linkage member 42 is constructed so that the distance between the centers of pivot pins 43 and 44 thereof is equal to one-half the distance between the centers of pivot pins 36 and 37 associated with the secondary arm member 35. As a result of this construction, pivot pins 36, 37 and 44 will always define the three corners of a right triangle with the secondary arm member 35 forming the hypotenuse and the linkage member 42 forming the median thereof. This construction prevents any longitudinal movement of the pad member 14 whenever such pad member is moved inwardly or outwardly in a lateral direction. In particular, the pivot pin 37 on the backside of pad member 14 will always remain in the same lateral plane as the fixed pivot pin 44 on the body of support member 13, any necessary adjustment of the right triangle to allow lateral movement of the pad member 14 being provided by longitudinal movement of the sliding block 30 to which the pivot pin 36 is connected.

The arm members for the other pad member 15 of the first pair are constructed in the same manner as the arm members for the first pad member 14. In particular, the pad member 15 includes a main arm member 45 and a secondary arm member 46 which are pivotally coupled between the sliding member 30 and the pad member 15 by way of pivot pins 47, 48, 49 and 50, these pivot pins defining the four corners of a parallelogram. Main arm member 45 is in the form of a bent lever arm. A linkage member 51 is provided which is pivotally coupled between the midpoint of the secondary arm member 46 and a fixed reference point on the support member 13 by means of pivot pins 52 and 53. Linkage member 51 is one-half the length of the secondary arm member 46. An additional arm member 54 is pivotally coupled between the lower end of pad member 15 and the body of support member 13 in the manner previously indicated.

Considering now the second pair of pad members 16 and 17, which are adapted to work at right angles to the first pair, these second pad members 16 and 17 are coupled to the second sliding member 31 and to the body of the support member 13 in a manner similar to that for the first pair. In particular, as seen in FIG. 4, the pad member 16 is pivotally coupled to the sliding block 31 by means of arm members 55 and 56 and associated pivot pins 57, 58, 59 and 60, these pivot pins defining the four corners of a parallelogram. The upper or main arm member 55 is of a nonlinear construction having an upper crank portion which is offset from a lower linear portion, the latter portion being the part extending between pivot pins 57 and 58. A linkage member 61 of one-half the length of arm member 56 is pivotally coupled between the midpoint of arm member 56 and a fixed reference point on support member 13 by means of pivot pins 62 and 63, respectively. The lower end of pad member 16 is coupled to the support member 13 by way of an additional arm member 64. In a similar manner, the pad member 17 is coupled to the sliding member 31 by means of arm members 65 and 66 and associated pivot pins 67, 68, 69 and 70, these pivot pins defining the four corners of a parallelogram. A linkage member 71 of one-half the length of arm member 66 is coupled between the midpoint of arm member 66 and a fixed reference point on the body of support member 13 by means of pivot pins 72 and 73, respectively. The lower end of pad member 17 is pivotally coupled to the support member 13 by way of an additional arm member 74.

The fixed reference points defined by pivot pins 44, 53, 63 and 73 for the four pad members 14–17 are located in the same lateral plane of the support member 13. As a consequence of this construction, the center electrodes 24, 25, 26 and 27 for the four pad members will always remain in the same plane regardless of the relative amounts of lateral extension of the different pad members. This relationship is very important for the case of dipmeter apparatus because it is very advantageous in this case that all the measurements made at any given instant be made at the same longitudinal or vertical depth in the borehole.

The necessary driving force for driving the various arm members and, hence, the various wall-engaging pad members outwardly from the body of the support member 13 is supplied by way of a primary driving member 75. This primary driving member 75 is coupled to the arm members for the two pairs of pad members by means of a force dividing mechanism which enables unequal lateral extension of the different pairs of pad members. An example of this unequal lateral extension is given in the cross-sectional view of FIG. 2A wherein it is seen that arm members 55 and 65 for the second pair of pad members 16 and 17 are extended a greater lateral distance than are the arm members 32 and 45 for the first pair of pad members 14 and 15. This force dividing action is provided by a rocker member 76 which is pivotally connected at its midpoint to an end portion 77 of the driving member 75 by means of a pivot pin 78.

One end or extremity of the rocker member 76 is coupled by way of a connecting rod 79 to a sliding block 80. The connections at both ends of the connecting rod 79 are made by way of suitable pivot pins. The lower end of sliding block 80 is coupled to the main arm members 32 and 45 for the first two pad members 14 and 15 by way of additional connecting rods 81 and 82. Connecting rod 81 is pivotally connected to the lower end of sliding block 80 by pivot pin 83 and is pivotally connected to the upper end of arm member 32 by pin 84. In a similar manner, the connecting rod 82 is pivotally connected to the lower end of sliding block 80 by pivot pin 85 and to the upper end of arm member 45 by pivot pin 86. In this manner, any downward movement of the sliding block 80 will act to extend both of the pad members 14 and 15. Since the arm systems for both pad members 14 and 15 are coupled to the common sliding block 80, the two pad members 14 and 15 will be extended by equal amounts at any given instant.

The other extremity of the rocker member 76 is coupled by way of a connecting rod 89 to a second and independent sliding block 90, suitable pivot pins connecting the two ends of the rod 89 to the rocker member 76 and to the sliding block 90. This second sliding block 90 serves to drive the pad extending arms associated with the second pair of pad members 16 and 17. Thus, as best seen in FIG. 4, the lower end of the second sliding block 90 is coupled to the upper ends of arm members 55 and 65 by way of connecting rods 91 and 92, all connections being provided by suitable pivot pins. Consequently, any downward movement of the sliding block 90 causes an outward extension of the arm members 55 and 65 and, hence, an outward extension of pad members 16 and 17. Since each of the arm members 55 and 65 is coupled to the common sliding block 90, the two pad members 16 and 17 will be extended by like amounts at any given instant. This extension for the pad members 16 and 17 need not be the same as that for the pad members 14 and 15, however, since the two sliding blocks 80 and 90 may assume different vertical positions relative to one another.

A driving force is applied to the primary driving member 75 by various elements located within the upper portion of the support member 13. As indicated in FIG. 3, the driving member 75 extends into this upper portion by passing through a fluid-tight partition 94 which serves to seal off this upper portion from the surrounding borehole environment. An O-ring 95 ensures a desired seal between the driving member 75 and the partition 94. The enclosed upper portion of support member 13 includes therein a rigid base member 96 having a threaded passageway 97 through the center thereof. The base member 96 is mounted in longitudinally-extending slots 98 which are cut into a metal liner 99 by means of guide pins 100 which extend from the base member 96, only one pin 100 and slot 98 being visible in this view. A worm gear 101 is threaded into the passageway 97 in the base member 96. This worm screw is fixed to the main body of the support member 13 by means of a ball bearing assembly 102 which is secured to an enlarged shoulder portion of the liner 99. The base member 96 has secured to the lower end thereof a metal sleeve portion 103 which extends downwardly and encloses an enlarged head piece 104 which is secured to the upper end of the primary driving member 75. Head piece 104 is retained within the sleeve 103 by provision of a constricted shoulder portion 105 at the lower end of sleeve 103. Sufficient clearance is provided so that driving member 75 may move freely in a longitudinal direction so long as head piece 104 does not contact the end portion 105. A flange member 106 is secured to a middle portion of the driving member 75 located within the fluid-tight section.

In order to impart a driving force to the driving member 75, elastic means in the form of a coil spring 108 is positioned between the base member 96 and the flange member 106. When this spring member 108 is compressed, the resulting restoring force of the spring acts to drive the flange member 106 and, hence, the primary driving member 75 in a downwardly direction. The base member 96 is normally restrained against longitudinal movement by the worm gear 101. If, however, it is desired to adjust the driving force applied to the driving member 75 and, hence, to the various wall-engaging pad members, then the worm gear 101 is rotated by means of an electric motor 110 which is connected to the upper end thereof. Such rotation of the worm gear 101 serves to adjust the position of the base member 96, hence, adjusting the compression of the coil spring 108.

The present borehole investigating apparatus also includes first and second signalling means for providing first and second signals representative of the magnitudes of lateral separation between the two pad members of each pair. The first signalling means for the first pair of pad members 14 and 15 is represented by a potentiometer 112. The wiper arm of this potentiometer 112 is mechanically coupled to the sliding block 80 associated with pad members 14 and 15 by way of a small connecting rod 113. The second signalling means for the second pair of pad members 16 and 17 is provided by a second potentiometer 114, the wiper arm of which is mechanically connected to the sliding block 90 for the second pair of pad members by way of a small connecting rod 115. The present apparatus also includes a third signalling means for providing a signal representative of the position of the base member 96. This signalling means is likewise located within the fluid-tight upper portion of support member 13 and is represented by a third potentiometer 116 which is mounted within a slot 117 which is cut into the metal liner 99 in the vicinity of the base member 96. The wiper arm for this third potentiometer 116 is mechanically connected to the base member 96 so that its position is representative of the position of base member 96.

The interior of the fluid-tight upper portion of support member 13 is filled with an electrically nonconductive fluid such as oil. In order to provide pressure equalization between this contained fluid and the outside borehole environment, a suitable expansion diaphragm is located in the upper end of the support member 13 in the region indicated by the ports 20 of FIG. 1. The interior side of this expansion diaphragm is hydraulically connected to the interior of the fluid-tight portion shown in FIG. 3 while the exterior of this diaphragm is exposed to the surrounding borehole environment by way of ports 20.

Referring now to FIG. 5 of the drawings, there is shown in a schematic manner a representative embodiment of electrical circuits for operating the borehole investigating apparatus fo FIG. 1. The circuits and elements located below dash line 120 of FIG. 5 are associated with the downhole portion of the apparatus, while the circuits shown above dash line 120 are located at the surface of the earth. As seen in FIG. 5, a power supply unit 121 serves to supply a 60-cycle supply voltage to the downhole portion of the apparatus by way of individual insulated conductors 21a and 21b contained within the armored cable 21. This 60-cycle supply voltage is supplied to a power supply unit 122 which is located in the downhole apparatus (fluid-tight housing 19 of FIG. 1) and which functions to develop the various alternating-current and direct-current supply voltages required by the various downhole circuits. The 60-cycle supply voltage on cable conductors 21a and 21b is also supplied to one winding of the electric motor 110 which was previously shown in FIG. 3. In this regard, motor 110 is a two-phase induction motor of the type commonly used in servo systems. The other winding of motor 110 is selectively energized by a second 60-cycle voltage supplied thereto by way of cable conductors 21b and 21c. This second 60-cycle voltage is derived by way of a control circuit 123 located at the surface of the earth.

Control circuit 123 includes a set of ganged switches 124, 125 and 126 and a push-pull type transformer 127. Transformer 127 includes a center tapped primary winding 128, the three terminals of which are connected to the three movable elements of switches 124–126. Transformer 127 also includes a secondary winding 129 which is connected across cable conductors 21b and 21c and which serves to apply the appropriate control voltage thereto. The 60-cycle supply voltage from the surface power supply 121 is applied to various ones of the stationary contacts on switches 124–126. The operation of switches 124–126 is such that when the movable elements thereof are in position a, a control voltage is applied to cable conductors 21b and 21c which is of the appropriate phase for driving the motor 110 in the appropriate direction for causing the pad members 14–17 to be pulled inwardly towards the body of the support member 13. In switch position b, no voltage is applied between cable conductors 21b and 21c and, hence, motor 110 remains at rest in this position. In switch position c, a voltage is applied to cable conductors 21b and 21c which is of opposite polarity (180° out-of-phase) with respect to the voltage applied thereto in position a. Thus, in position c the motor 110 is rotated in the opposite direction, which direction is appropriate for causing the pad members 14–17 to be moved outwardly away from the body of the support member 13. Switch position d is for automatic operation of the apparatus which will be considered hereinafter.

Considering the downhole elements shown in FIG. 5, the four pad members 14–17 are there represented in a schematic manner. These pad members are adapted to be operated by appropriate electrode circuits 130 for individually providing separate measure signals representative of the resistivity or conductivity of the formation material in front of the wall-engaging faces thereof. In this regard, the electrode construction for these pad members is represented as being of the focussed type. In particular, for the pad member 14, for example, a survey current is emitted from the small center electrode 24, while a focussing current is emitted from the remainder of the pad member 14 which thus behaves as a focussing electrode. The four measure signals obtained with pad members 14–17 are supplied by the electrode circuits 130 to a telemeter transmitter 131.

The signalling means represented by potentiometers 112, 114 and 116 of FIG. 3 are also represented in FIG. 5. These potentiometers are adapted to be energized by a common reference voltage supplied thereto from the downhole power supply 122 by way of conductors 132 and 133. The resulting voltages appearing at the wiper arms of these potentiometers are then representative of the physical factors which control the adjustment of these wiper arms. In particular, the wiper arm of potentiometer 112 is controlled by the magnitude of extension of the first set of pad members 14 and 15. Consequently, the voltage signal on this wiper arm is representative of the diameter of the borehole 11 in the direction of extension of these pad members 14 and 15. In a similar manner, the wiper arm of potentiometer 114 is controlled by the lateral extension of the pad members 16 and 17 and, hence, this wiper arm signal represents the borehole diameter in the direction of extension of pad members 16 and 17. The wiper arm of potentiometer 116, on the other hand, is controlled by the position of the base member 96 which, in turn, controls the compression of the coil spring 108. The signal on the wiper arm of potentiometer 116 thus represents the position of the base member 96.

Also shown in FIG. 5 are three additional potentiometers 134, 135 and 136. These potentiometers 134–136 represent the signalling elements of an appropriate apparatus for measuring the slope or inclination of the borehole 11. This inclination measuring apparatus is located in the fluid-tight housing 19 coupled to the upper end of the support member 13 (see FIG. 1). An appropriate construction for this inclination measuring apparatus is described in detail in United States Patent 2,746,162, granted to M. Picard on May 22, 1956. Assuming that this form of inclination measuring apparatus is used, then potentiometer 134 provides an indication of the angle of inclination of the borehole, while potentiometer 135 provides a compass signal representing the compass direction in which the pad member 14 is pointing, and potentiometer 136 provides a signal representative of the relative bearing of the borehole 11 with respect to the pad member 14. These additional measurements provided by potentiometers 134–136 are used, together with the measure signals provided by the electrode circuits, to determine the dip angle of the subsurface earth formations.

The various signals developed by potentiometers 112, 114, 116, 134, 135 and 136 are also supplied to the telemeter transmitter 131. Telemeter transmitter 131 serves to multiplex the various signals supplied thereto onto a common carrier signal which is then transmitted by way of cable conductors 21d and 21e to the surface of the earth. Telemeter transmitter 131 may be of either the time multiplex or frequency multiplex type.

At the surface of the earth, the common carrier signal transmitted by way of cable conductors 21d and 21e is applied to a telemeter receiver 137. This telemeter receiver 137 serves to detect the various modulation components of the carrier and to separate these components from one another so as to reproduce the various signals originally supplied to the input of the telemeter transmitter 131. The three inclination signals provided by potentiometers 134–136 and the four measure signals provided by the electrode circuits associated with the pad members 14–17 are then supplied to a recorder 138 for making permanent records thereof.

The three signals corresponding to the signals developed by potentiometers 112, 114 and 116 and which are representative of the mechanical operation of the present apparatus are supplied to a computer 140. These three signals are used to determine the average bearing pressure of the pad members 14–17 on the borehole wall. An indication of this average bearing pressure is provided by a meter or indicating device 141. The signal corresponding to the signal developed by potentiometer 134, which is representative of the angle of inclination of the borehole, is also supplied to the computer 140. This signal is used to determine the optimum bearing pressure for the particular borehole inclination being encountered. This optimum bearing pressure is indicated by a second indicating device 142. As will be seen, the computer 140 can be used to provide automatic control of the motor 110 so that the pad members 14–17 are continuously applied to the borehole wall with the optimum bearing pressure.

The downhole power supply unit 122, the electrode circuits 130 and the telemeter transmitter 131 are located in the fluid-tight housing 19 coupled to the upper end of the support member 13.

Referring now to FIG. 6 of the drawings, there is shown the details of the computer 140 of FIG. 5. As seen in FIG. 6, the diameter representative signals obtained from potentiometers 112 and 114 and designated as $D_1$ and $D_2$, respectively, are supplied by way of resistors 143 and 144 to the input of a high-gain amplifier 145. A feedback resistor 146 is connected between the input and output of the amplifier 145. Input resistors 143 and 144, amplifier 145 and feedback resistor 146 constitute an operational amplifier type summation circuit which is used to combine the two diameter representative input signals $D_1$ and $D_2$ in accordance with the relationship:

$$D = \frac{D_1 + D_2}{2} \quad (1)$$

where the quantity D represents the signal appearing at the output of amplifier 145. The value D represents the average diameter of the borehole. The minus sign denotes the polarity reversal provided by the operational amplifier circuit. The factor of one-half is introduced by making each of the input resistors 143 and 144 of twice the value of the feedback resistor 146.

The two diameter representative signals $D_1$ and $D_2$ are also separately indicated by way of indicating devices 147 and 148.

The average bearing pressure of the pad members 14–17 on the wall of the borehole is represented at any given instant by the compression of the coil spring 108, since it is this compression which provides the driving force which drives the pad members against the borehole wall. The compression of the coil spring 108 is determined by the spacing between the base member 96 and the flange member 106. A signal representative of the position of the base member 96, which signal is designated as L, is provided by the potentiometer 116. An indication of this signal is provided on an indicating device 149 (FIG. 6). The position of the flange member 106 is determined by the position of the primary driving member 75 which, in turn, is determined by the average diameter of the borehole. In particular, the movement of the primary driving member 75 is equal to one-half of the sum of the movements of the sliding blocks 80 and 90. The movement of the sliding block 80 is determined by the opening of the first pair of pad members 14 and 15 and, hence, by the diameter $D_1$. The movement of the sliding block 90, on the other hand, is determined by the extension of the second pair of pad members 16 and 17 and, hence, by the second diameter $D_2$. Consequently, the position of the primary driving member 75 and, hence, of the flange member 106 can be defined in terms of the average borehole diameter D.

Knowing the position of the base member 96 and the flange member 106, the compression of the coil spring 108 and, hence, the average bearing pressure of the pad members 14–17 can be determined. In particular, the average bearing pressure P is described by the following mathematical expression:

$$P = aL - bD \quad (2)$$

where L denotes the position of the base member 96, D represents the average diameter of the borehole and $a$ and $b$ are apparatus constants depending on the physical construction of the particular apparatus and the associated signalling devices.

In order for the FIG. 6 computer to solve Equation 2 and, hence, provide a signal corresponding to the average bearing pressure, the signal L representing the position of base member 96 is supplied by way of a variable resistor 150 to the input terminal of a high-gain amplifier 151. At the same time, the average diameter signal D appearing at the output of amplifier 145 is supplied by way of a variable resistor 152 to the same input terminal of amplifier 151. Amplifier 151 is also provided with a feedback resistor 153. Consequently, amplifier 151, together with resistors 150, 152 and 153, constitutes an operational amplifier type summation circuit. The value of variable resistor 150 relative to the feedback resistor 153 is set in accordance with the apparatus constant $a$, while the value of variable resistor 152 relative to the feedback resistor 153 is set in accordance with the apparatus constant $b$. Since the average diameter signal D is of opposite polarity to the base member position signal L, the summation process, which is an algebraic summation, causes a subtraction of these two signals. Consequently, the resulting signal at the output of amplifier 151 corresponds to the desired average bearing pressure P. This signal is of negative polarity due to the polarity inversion provided by the operational amplifier circuit. This negative polarity signal $-P$ is then converted to a positive polarity signal by means of an inverter circuit 155. The positive polarity average bearing pressure signal at the output of inverter 155 is supplied to the indicating device 141 to provide a visual indication of the value thereof.

In order to provide a signal representative of the optimum bearing pressure which should be used for the particular borehole condition being encountered, a signal I provided by potentiometer 134 (FIG. 5) and corresponding to the angle of inclination of the borehole with respect to vertical is supplied by way of a variable resistor 156 to the input terminal of a high-gain amplifier 157. Also supplied to the input of amplifier 157, by way of a second input resistor 158, is a signal $P_v$ corresponding to the bearing pressure which is desired in the case of a truly vertical borehole. This signal is obtained from a potentiometer 159 which is coupled across a reference voltage source V. Adjustment of the wiper arm of potentiometer 159 enables the operator to select the bearing pressure which is desired in the case of a truly vertical borehole. The amplifier 157 is also provided with a feedback resistor 160. Amplifier 157, together with resistors 156, 158 and 160, constitutes an operational amplifier type summation circuit. Consequently, the signal $P_o$ appearing at the output of amplifier 157 is described by the expression:

$$P_o = P_v + cI \quad (3)$$

where c is a circuit constant determined by the value of the variable resistor 156 relative to the feedback resistor 160.

Equation 3 represents the fact that the optimum bearing pressure $P_o$ increases as the angle of inclination of the borehole increases. This is because the greater the inclination, the greater is the pad pressure required to ensure that the central support member 13 remains centered in the borehole and that all of the pad members continue to provide good contact with the borehole wall. The proportionality constant c depends upon the physical construction of the tool as well as the scale factor for the circuits which provide the inclination signal I. The optimum bearing pressure signal $P_o$ appearing at the output of amplifier 157 is supplied to indicating device 142 to provide a visual indication thereof.

In order to provide for an automatic operation of the pad extending arm system, the average actual bearing pressure signal P appearing at the output of inverter 155 is supplied by way of a resistor 161 to the input terminal of a high-gain amplifier 162. The optimum having pressure signal $P_o$ appearing at the output of amplifier 157 is also supplied to the same input terminal by way of a resistor 163. The amplifier 162 is provided with a feedback resistor 164. Amplifier 162, together with resistors 161, 163 and 164, thus constitutes an operational amplifier type summation circuit. The resistor values are chosen to provide a direct one-for-one combination of the two signals. Since the $P_o$ signal is of opposite polarity to the P signal, the net signal at the output of amplifier 162 corresponds to the difference between these two input signals. This net signal at the output of amplifier 162 constitutes an "error" signal which represents the amount by which the actual bearing pressure P differs from the optimum bearing pressure $P_o$.

This error signal is amplified by a power amplifier 165 and, provided the automatic mode of operation is selected, is used to provide a control signal for the electric motor 110 contained in the downhole part of the apparatus. More particularly, in the automatic mode of operation, the three output terminals of power amplifier 165 are connected to contacts d of switches 124, 125 and 126 as shown in FIG. 5. In this automatic mode of operation, the transformer 127 of FIG. 5 is used as the output transformer for the power amplifier 165. Consequently, the final stage of power amplifier 165 is of the balanced or push-pull type.

The precise construction of the power amplifier 165 will depend somewhat on whether the error signal supplied to the input thereof is in the form of a direct-current signal or, instead, in the form of an alternating-current signal. In the case of an alternating-current error signal, the power amplifier 165 can take the form of an ordinary push-pull amplifier, preceded by the usual phase splitter for converting to a balanced mode of operation. In the case of a direct-current error signal, on the other hand, the amplifier 165 is of the form of a balanced, variable-gain amplifier wherein the direct-current error signal is used to control the amplification of an alternating-current reference signal which is supplied to the input of the amplifier. More particularly, in the case of a balanced, variable-gain amplifier, an alternating-current reference signal of fixed amplitude is supplied in parallel and with the same polarity to the control electrodes of the amplifier devices in the two halves of the circuit, while the direct-current error signal is supplied to these same control electrodes in a balanced or push-pull manner.

If desired, any one or more of the $D_1$, $D_2$, L, P and $P_o$ signals, which signals are visually indicated by indicating devices 147, 148, 149, 141 and 142, respectively, may be supplied to the recorder 138 so as to provide permanent records thereof as the apparatus is moved through the borehole.

Considering now the operation of the investigating apparatus thus far described, the wall-engaging pad members 14–17 are initially retracted against the body of the support member 13 and the apparatus as a whole, as shown in FIG. 1, is then lowered to the lowermost depth of interest in the borehole 11. In this retracted position the base member 96 (FIG. 3) is located at its uppermost position inside the support member 13. In this uppermost position, the shoulder 105 thereof contacts the head 104 of the primary driving member 75, thus maintaining the driving member 75 at its uppermost position, in which position the pad members 14–17 are collapsed tightly against the body of the support member 13. At this time, the switches 124–126 of the surface control circuit 123 (FIG. 5) are set at position b and the electric motor 110 is not energized.

With the downhole apparatus at the lowermost depth of interest, switches 124–126 of the surface control circuit 123 are set to position c. This energizes the electric motor 110 which rotates the worm gear 101 in such a direction as to drive the base member 96 in a downward direction. This disengages the shoulder 105 from the head 104 and initiates a compression of the coil spring 108. This compression of coil spring 108 in turn drives the primary driving member 75 in a downward direction. This driving force is transmitted by way of the rocker member 76 and the connecting rods 79 and 89 to the two sliding blocks 80 and 90. The resulting downward movement of sliding block 80 is transferred by way of connecting rods 81 and 82 to the upper arm members 32 and 45 associated with the pad members 14 and 15. The resulting leverage drives the lower ends of arm members 32 and 45 and, hence, the pad members 14 and 15 outwardly from the body of the support member 13. At the same time, the downward movement of the second sliding block 90 is transferred by way of connecting rods 91 and 92 to the upper arm members 55 and 65 associated with the second pair of pad members 16 and 17. This drives the lower ends of arm members 55 and 65 and, hence, the pad members 16 and 17 outwardly and away from the body of the support member 13.

So long as none of the pad members 14–17 comes into contact with the wall of the borehole, the coil spring 108 functions primarily as a force-transmitting member, the force being supplied by the downward movement of the base member 96. When the pad members 14–17 come into contact with the side wall of the borehole, then further outward movement of these pad members is prevented and this, in turn, prevents further downward movement of the primary driving member 75. If the base member 96 is allowed to continue its downward movement, then the coil spring becomes compressed more and more since flange member 106 is no longer moving. The resulting restoring force in the coil spring 108 then acts to increase the force or pressure on the primary driving member 75 and, hence, to increase the bearing pressure of the pad members 14–17 on the wall of the borehole. An indication of the magnitude of this bearing pressure is provided on the indicating device 141 located at the surface of the earth. This actual bearing pressure is compared with the optimum bearing pressure indicated on indicating device 142. When the actual bearing pressure becomes equal to the optimum bearing pressure, then switches 124–126 of the surface control circuit 123 are set to position d to provide an automatic control or regulation of the pad member bearing pressure.

At this time, the downhole portion of the apparatus is ready to begin its upward journey through the borehole, during which journey the desired resistivity measurements will be made by the pad members 14–17 and the desired inclination measurements will be made by the devices associated with potentiometers 134–136. These measurements are made in a continuous manner during this upward journey and the resulting measure signals are supplied by way of telemeter transmitter 131, cable conductors 21d and 21e and telemeter receiver 137 to the recorder 138 located at the surface of the earth. Recorder 138 makes a permanent record of these measure signals as a function of the depth of the downhole apparatus in the borehole.

During the course of the upward journey of the downhole apparatus through the borehole, borehole regions of differing sizes, shapes and inclinations will be encountered. Any change in one or more of these borehole parameters will tend to either increase or decrease the actual bearing pressure of the pad members 14–17 with respect to the optimum value initially established. With the present apparatus, however, this tendency is overcome by the automatic feedback control action provided by the computer 140 and the control circuit 123 located at the surface of the earth. In particular, the signals developed by potentiometers 112, 114, 116 and 134 located in the downhole apparatus are supplied by way of the telemetering system represented by telemeter transmitter 131, cable conductors 21d pand 21e and telemeter receiver 137 to the computer 140 located at the surface. As previously indicated in connection with FIG. 6, the computer 140 uses these signals to calculate both the actual average bearing pressure P and the optimum bearing pressure $P_o$ for the pad members 14–17. These actual and optimum values are then compared within computer 140 and, if any difference appears therebetween, an error signal of appropriate polarity is generated and supplied by way of switches 124–126, transformer 127 and cable conductors 21b and 21c to the control winding of the electric motor 110 located in the borehole apparatus. This error signal is of the appropriate polarity to drive the motor 110 in the proper direction so as to adjust the compression of coil spring 108 and, hence, the pad member bearing pressure so as to reduce the error. In other words, the feedback action is of a degenerative nature and adjustment of the pad member bearing pressure continues until the actual bearing pressure becomes equal to the optimum bearing pressure. When this occurs, the error signal goes to zero and the electric motor 110 is no longer energized. In this manner, the average pad member bearing pressure is continuously regulated and automatically adjusted to the optimum value whenever varying borehole conditions are encountered.

Whenever the borehole measurements are completed and it is desired to withdraw the downhole apparatus from the borehole, or whenever it is desired to return to a lower depth in the borehole in order to repeat some measurements, then the switches 124–126 are set to position *a*, in which case the appropriate polarity of voltage is supplied to the control winding of motor 110 for causing the motor to rotate in the appropriate direction for moving the base member 96 to its uppermost position and, hence, for retracting the pad members 14–17. The reading of indicating device 149 in the computer 140, which reading corresponds to the position of the base member 96, can be used to indicate when the base member 96 has reached its uppermost position. Thereupon switches 124–126 are set to position *b*, in which position no energizing voltage is supplied to the control winding of motor 110.

The horizontal position for the rocker member 76 which is shown in FIG. 3 corresponds to the case of a circular borehole as shown in FIG. 2. In other words, when both sets of pad members are extended by the same amount, then the rocker member 76 remains in a horizontal position. If the borehole is of a non-circular cross-section, as indicated in FIG. 2A, for example, then the rocker member 76 is tilted in a downward direction toward the particular one of connecting rods 79 and 89 which is associated with the pair of pad members which is extended the greater amount. For the example of FIG. 2A, the rocker member 76 would be tilted downward in the direction of connecting rod 89 and the sliding block 90 would be at a lower longitudinal position than the sliding block 80. Even so, one-half the sum of the movements of sliding blocks 80 and 90 remains equal to the movement of the primary driving member 75. Consequently, the downward movement of primary driving member 75 is still representative of the average diameter of the borehole.

As indicated in connection with FIG. 2A, a particular feature of the present invention is that accurate measurements can consistently be made in the case of non-circular boreholes. Also, since signals are generated which correspond to the borehole diameter as measured in two different directions, it is possible to determine with a greater degree of accuracy the true shape of the borehole. These separate diameter measurements are separately indicated on indicating devices 147 and 148 (FIG. 6) and, if desired, may be supplied to the recorder 138 (FIG. 5) to provide a permanent record thereof.

Another feature of the present apparatus is that the use of four pad members to provide four resistivity measurements provides a greater amount of information concerning the earth formations surrounding the borehole. Also, the fact that the center electrodes on the pad members are always maintained in the same plane and are arranged to define in this plane the four corners of an equilateral parallelogram provides an advantage in the case of dipmeter apparatus in that the subsequent calculation of the formation dip angle is considerably simplified.

Referring now to FIG. 7 of the drawings, there is shown a modified form of construction for a portion of the FIG. 1 apparatus. Elements which are the same as those of FIG. 1 are identified by the same reference numerals. Elements which are similar, but not necessarily identical, are indicated by the same reference numeral with a suffix *a* attached thereto.

Considering now the details of FIG. 7, there is included an elongated support member 13a and a first pair of wall-engaging pad members 14a and 15a. A second pair of pad members positioned along a line at right angles to the center line for the first pair is also included but, for sake of simplicity, have been omitted from the view of FIG. 7. The pad member 14a includes a sliding member 170 which is slidably mounted on the backside thereof for providing a longitudinal movement with respect to the support member 13a. Arm members 32 and 35a are pivotally coupled between this pad-located sliding member 170 and the body of the support member 13a proper. In particular, pivot pins 171 and 172 which couple the arms 32 and 35a to the body of the support member 13a are mounted at fixed locations on the body of support member 13a and these locations are not subject to any adjustments or movements with respect to the support member 13a. The four pivot pins for the arms 32 and 35a define the four corners of a parallelogram so that the wall-engaging face of pad member 14a will always be maintained parallel to the longitudinal axis of the support member 13a. A lower arm member 38a is pivotally coupled between the lower end of pad member 14a and the support member 13a, the pivot at the lower end of arm member 38a being located in a slot 41 in the body of support member 13a to provide for a limited longitudinal adjustment of its position.

A linkage member 42a is pivotally coupled between the midpoint of the arm member 38a and a fixed reference point on the body of support member 13a. The length of the linkage member 42a is equal to one-half the length of the arm member 38a. Pivot pin 176 is in the same lateral plane with pivot pin 173 at the lower end of pad member 14a. Pivot pins 173, 174 and 176 define the three corners of a right triangle. This right triangle construction, with the linkage member 42a being a medium line thereof, serves to always keep the pivot pin 173 at the lower end of pad member 14a at the same longitudinal level as the fixed reference point pivot pin 176, regardless of the amount of lateral extension of the upper arm members 32 and 35a. As the upper arm members 32 and 35a are extended outwardly from the support member 13a, the lower ends of these arm members must move in an upward as well as an outward direction. This component of upward movement is taken into account by the sliding member 170 which is free to move in an upward direction with respect to the main body of the pad member 14a. Consequently, the fact that the lower arm members 38a and 42a prevent the main body of pad member 14a from moving in an upward direction does not interfere with the operation of the upper arm members 32 and 35a.

The second pad member 15a of this first pair is constructed in a similar fashion. In particular, a sliding member 177 is mounted on the backside of the pad member 15a and is adapted to provide longitudinal movement with respect thereto. Upper arm members 45 and 46a are then pivotally coupled between this sliding member 177 and the body of the support member 13a. Lower arm member 54a is pivotally coupled between the pad member 15a and the support member 13a and linkage member 51a is pivotally coupled between the midpoint of arm member 54a and the body of support member 13a. The length of linkage member 51a is equal to one-half the length of the arm member 54a and the upper pivot pin for linkage member 51a, namely, pivot pin 178, is located at the same longitudinal level as the upper pivot pin 176 for the linkage member 42a associated with the first pad member. Thus, both pad member 14a and pad member 15a will always be maintained at the same longitudinal level.

As in the original FIG. 1 embodiment, the upper ends of the upper two arm members 32 and 45 of the FIG. 7 embodiment are connected by way of individual connecting rods 81 and 82 to a sliding block 80. The second pair of pad members which are at right angles to the first pair and which are not shown in FIG. 7 are constructed in a similar fashion and are connected to the second sliding block 90. The primray driving member 75 is connected to the sliding block 80 by way of rocker member 76 and connecting rods 180 and 181. Similarly, the second sliding block 90 for the second pair of pad members is connected to the other extremity of the rocker member 76 by way of connecting rods 182 and 183. It is noted that in this embodiment the primary driving member 75 and the rocker member 76 are completely contained within the fluid-tight upper portion of the support member 13a, the lower end of this fluid-tight upper portion being defined by the bottom wall or partition 185.

The remainder of the FIG. 7 apparatus is identical to that of the original FIG. 1 apparatus and, hence, is not shown. Also, the electrical circuits and the manner of operation of the FIG. 7 apparatus may be the same as for the FIG. 1 apparatus and, hence, need not be discussed in detail. It is sufficient to note that, as in the FIG. 1 embodiment, the pad members of the different pairs are adapted to undergo different amounts of lateral extension relative to one another. At the same time, however, all four pad members are always maintained in the same lateral plane with respect to the support member, that is, they cannot undergo any longitudinal movement with respect to one another.

While there have been described what are at present considered to be preferred embodiments of this invention, it will be obvious to those skilled in the art that various changes and modifications may be made therein without departing from the invention and it is, therefore, intended to cover all such changes and modifications as fall within the true spirit and scope of the invention.

What is claimed is:

1. In apparatus for investigating earth formations traversed by a borehole, the combination comprising: an elongated support member adapted for longitudinal movement through a borehole; a first pair of wall-engaging pad members individually disposed on opposite sides of the support member along a given line; a second pair of wall-engaging pad members individually disposed on opposite sides of the support member along a line at right angles to the given line for the first pair; a first set of arm means coupling the first pair of pad members to the support member for enabling lateral movement of these pad members with respect to the support member; a second set of arm means coupling the second pair of pad members to the support member for enabling lateral movement of these pad members with respect to the support member; linkage means coupled to the support member and to the pad members for preventing longitudinal movement of the pad members with respect to the support member whenever the pad members undergo lateral movement with respect thereto; a primary driving member; a rocker member pivotally connected intermediate its extremities to the primary driving member; a pair of secondary driving mechanisms coupling the two extremities of the rocker member to different ones of the two sets of arm means; a rigid base member; elastic means acting between the base member and the primary driving member for applying a driving force to the primary driving member; means for adjusting the position of the base member with respect to the primary driving member for adjusting the driving force applied thereto; motor means for selectively actuating the position adjusting means; first and second signalling means for providing first and second signals representative of the magnitudes of lateral separation between the two pad members of each pair; third signalling means for providing a third signal representative of the position of the base member; means responsive to the first, second and third signals for providing an indication of the bearing pressure of the pad members on the wall of the borehole; and means for controlling the motor means for adjusting the pad member bearing pressure.

2. In apparatus for investigating earth formations traversed by a borehole, the combination comprising: an elongated support member adapted for longitudinal movement through a borehole; a first pair of wall-engaging pad members individually disposed on opposite sides of the support member along a given line; a second pair of wall-engaging pad members individually disposed on opposite sides of the support member along a line at right angles to the given line for the first pair; a pair of sliding members mounted on the support member for providing longitudinal movement with respect thereto; a first set of arm members pivotally coupled to one of the sliding members and to the first pair of pad members for enabling lateral movement of these pad members with respect to the support member; a second set of arm members pivotally coupled to the other of the sliding members and to the second pair of pad members for enabling lateral movement of these pad members with respect to the support member; linkage means coupled to the support member and to the pad members for preventing longitudinal movement of the pad members with respect to the support member whenever the pad members undergo lateral movement with respect thereto; a primary driving member; a rocker member pivotally connected intermediate its extremities to the primary driving member; a pair of secondary driving mechanisms coupling the two extremities of the rocker member to different ones of the two sets of arm members; a rigid base member; elastic means acting between the base member and the primary driving member for applying a driving force to the primary driving member; means for adjusting the position of the base member with respect to the primary driving member for adjusting the driving force applied thereto; motor means for selectively actuating the position adjusting means; first and second signalling means for providing first and second signals representative of the magnitudes of lateral separation between the two pad members of each pair; third signalling means for providing a third signal representative of the position of the base member; means responsive to the first, second and third signals for providing an indication of the bearing pressure of the pad members on the wall of the borehole; and means for controlling the motor means for adjusting the pad member bearing pressure.

3. In apparatus for investigating earth formations traversed by a borehole, the combination comprising: an elongated support member adapted for longitudinal movement through a borehole; a first pair of wall-engaging pad members individually disposed on opposite sides of the support member along a given line; a second pair of wall-engaging pad members individually disposed on opposite sides of the support member along a line at right angles to the given line for the first pair; sliding members movably mounted on each of the pad members for providing longitudinal movement of the sliding members with respect to the support member; a first set of arm members pivotally coupled to the support member and to the sliding members on the first pair of pad members for enabling lateral movement of these pad members with respect to the support member; a second set of arm members pivotally coupled to the support member and to the sliding members on the second pair of pad members for enabling lateral movement of these pad members with respect to the support member; linkage means coupled to the support member and to the pad members for preventing longitudinal movement of the pad members with respect to the support member whenever the pad members undergo lateral movement with respect thereto; a primary driving member; a rocker member pivotally connected intermediate its extremities to the primary driving member; a pair of secondary driving mechanisms coupling the two extremities of the rocker member to different ones of the two sets of arm members; a rigid base member; elastic means acting between the base member and the primary driving member for applying a driving force to the primary driving member; means for adjusting the position of the base member with respect to the primary driving member for adjusting the driving force applied thereto; motor means for selectively actuating the position adjusting means; first and second signalling means for providing first and second signals representative of the magnitudes of lateral separation between the two pad members of each pair; third signalling means for providing a third signal representative of the position of the base member; means responsive to the first, second and third signals for providing an indication of the bearing pressure of the pad members on the wall of the borehole; and means for controlling the motor means for adjusting the pad member bearing pressure.

4. In apparatus for investigating earth formations traversed by a borehole, the combination comprising: an elongated support member adapted for longitudinal movement through a borehole; a first pair of wall-engaging pad members individually disposed on opposite sides of the support member along a given line; a second pair of wall-engaging pad members individually disposed on opposite sides of the support member along a line at right angles to the given line for the first pair; a first set of arm means coupling the first pair of pad members to the support member for enabling lateral movement of these pad members with respect to the support member; a second set of arm means coupling the second pair of pad members to the support member for enabling lateral movement of these pad members with respect to the support member; linkage means coupled to the support member and to the pad members for preventing longitudinal movement of the pad members with respect to the support member whenever the pad members undergo lateral movement with respect thereto; a primary driving member; a rocker member pivotally connected intermediate its extremities to the primary driving member; a pair of secondary driving mechanisms coupling the two extremities of the rocker member to different ones of the two sets of arm means; a rigid base member; a coil spring acting between the base member and the primary driving member for applying a driving force to the primary driving member; worm gear means for adjusting the position of the base member with respect to the primary driving member for adjusting the driving force applied thereto; an electric motor for selectively actuating the worm gear means; first and second signalling means for providing first and second electrical signals representative of the magnitudes of lateral separation between the two pad members of each pair; third signalling means for providing a third electrical signal representative of the position of the base member; electrical analog computer means responsive to the first, second and third signals for providing an electrical signal representative of the bearing pressure of the pad members on the wall of the borehole; and feedback control circuit means responsive to the bearing pressure signal for controlling the electric motor for automatically regulating the pad member bearing pressure.

5. In apparatus for investigating earth formations traversed by a borehole, the combination comprising: an elonagted support member adapted for longitudinal movement through a borehole; a plurality of wall-engaging members; at least one arm member individually coupling each of the different wall-engaging members to the support member, slide members coupled to said support member and upon which said wall-engaging members are slidably mounted, said slide members being arranged to move longitudinally with respect to said support member, and means for preventing longitudinal movement of the wall-engaging members with respect to the support member.

6. In apparatus for investigating earth formations traversed by a borehole, the combination comprising: an elongated support member adapted for longitudinal movement through a borehole; a plurality of wall-engaging members; at least one arm member individually coupling each of the different wall-engaging members to the support member, the connection between the arm member and the wall-engaging member being a fixed pivotal connection; a base member for slidably supporting each of said wall-engaging members; means pivotally connecting said base members with said support member and arranged to permit longitudinal movement of said base members relative to said support member; means for preventing longitudinal movement of the wall-engaging members with respect to the support member; and means for applying separate driving forces to the different wall-engaging members for enabling unequal lateral extension of the different wall-engaging members.

7. In apparatus for investigating earth formations traversed by a borehole, the combination comprising: an elongated support member adapted for longitudinal movement through a borehole; a plurality of wall-engaging members; a plurality of sliding members movably mounted on the support member for providing longitudinal movement of the sliding members with respect to the support member; a plurality of arm members each being individually pivotally coupled to one of the sliding members and to one of the wall-engaging members for enabling movement of the wall-engaging members away from the support member; a plurality of linkage means each being individually coupled to the support member and to one of the wall-engaging members for preventing longitudinal movement of the wall-engaging members with respect to the support member; and means for applying separate driving forces to the different arm members for enabling unequal lateral extension of the different wall-engaging members.

8. In apparatus for investigating earth formations traversed by a borehole, the combination comprising: an elongated support member adapted for longitudinal movement through a borehole; a plurality of wall-engaging members; a sliding member movably mounted on each of the wall-engaging members each being for providing longitudinal movement of the sliding members with respect to the wall-engaging members; a plurality of arm members each being individually pivotally coupled to the support member and to one of the sliding members for enabling movement of the wall-engaging members away from the support member; a plurality of linkage means each being individually coupled to the support member and to one of the wall-engaging members for preventing longitudinal movement of the wall-engaging members with respect to the support member; and means for applying separate driving forces to the different arm members for enabling unequal lateral extension of the different wall-engaging members.

9. In apparatus for investigating earth formations traversed by a borehole, the combination comprising: an elongated support member adapted for longitudinal movement through a borehole; a plurality of wall-engaging members; a plurality of sliding members movably mounted on the support member for providing longitudinal movement of the sliding members with respect to the support member; a plurality of primary arm members each of which is individually pivotally coupled to one of the sliding members and to one of the wall-engaging members for enabling movement of the wall-engaging members away from the support member; a plurality of secondary arm members each of which is individually pivotally coupled to one of the sliding members and to one of the wall-engaging members at a predetermined distance from the corresponding primary arm member; a plurality of linkage members each of which is individually coupled between the support member and the midpoint of one of the secondary arm members for preventing longitudinal movement of the wall-engaging members with respect to the support member; and means for applying separate driving forces to the different primary arm members for enabling unequal lateral extension of the different wall-engaging members.

10. In apparatus for investigating earth formations traversed by a borehole, the combination comprising: an elongated support member adapted for longitudinal movement through a borehole; a plurality of wall-engaging members; a sliding member movably mounted on each of the wall-engaging members for providing longitudinal movement of the sliding member with respect to the wall-engaging member; a plurality of primary arm members each of which is individually pivotally coupled to the support member and to one of the sliding members for enabling movement of the wall-engaging members away from the support member; a plurality of secondary arm members each of which is individually pivotally coupled to the support member and to one of the wall-engaging members; a plurality of linkage members each of which is individually coupled between the support member and the midpoint of one of the secondary arm members for preventing longitudinal movement of the wall-engaging members with respect to the support member; and means for applying separate driving forces to the different primary arm members for enabling unequal lateral extension of the different wall-engaging members.

11. In apparatus for investigating earth formations traversed by a borehole, the combination comprising: an elongated support member adapted for longitudinal movement through a borehole; a wall-engaging member; a movable sliding member connected by link means between the support member and the wall-engaging member for providing longitudinal movement of the sliding member with respect to the support member; said link means including an arm member pivotally coupled to the sliding member for enabling lateral movement of the wall-engaging member away from the support member; said wall-engaging member being slidably mounted on said movable sliding member for providing relative longitudinal movement therebetween; linkage means coupled to the support member and to the wall-engaging member for preventing longitudinal movement of the wall-engaging member with respect to the support member; and means for applying a driving force to the arm member for causing lateral extension of the wall-engaging member.

12. In apparatus for investigating earth formations traversed by a borehole, the combination comprising: an elongated support member adapted for movement through a borehole; a first pair of wall-engaging pad members individually disposed on opposite sides of the support member along a given line; a second pair of wall-engaging pad members individually disposed on opposite sides of the support member along a line at right angles to the given line for the first pair; first pad extending means for moving the pad members of the first pair away from the support member and against the borehole wall; second pad extending means for moving the pad members of the second pair away from the support member and against the borehole wall; primary driving means; a force dividing mechanism coupling the primary driving means to the first and second pad extending means for enabling unequal lateral extension of the pad members of the different pairs; means for applying a driving force to the primary driving means; means for providing an indication of the bearing pressure of the pad members on the borehole wall; and means for adjusting the driving force applied to the primary driving means thereby to enable regulation of the bearing pressure.

13. In apparatus for investigating earth formations traversed by a borehole, the combination comprising: an elongated support member adapted for movement through a borehole; a first pair of wall-engaging pad members individually disposed on opposite sides of the support member along a given line; a second pair of wall-engaging pad members individually disposed on opposite sides of the support member along a line at right angles to the given line for the first pair; first pad extending means for moving the pad members of the first pair away from the support member and against the borehole wall; second pad extending means for moving the pad members of the second pair away from the support member and against the borehole wall; primary driving means; a force dividing mechanism coupling the primary driving means to the first and second pad extending means for enabling unequal lateral extension of the pad members of the different pairs; and means for applying a driving force to the primary driving means.

14. In apparatus for investigating earth formations traversed by a borehole, the combination comprising: an elongated support member adapted for movement through a borehole; a first pair of wall-engaging pad members individually disposed on opposite sides of the support member along a given line; a second pair of wall-engaging pad members individually disposed on opposite sides of the support member along a line at right angles to the given line for the first pair; first pad extending means for moving the pad members of the first pair away from the support member and against the borehole wall; second pad extending means for moving the pad members of the second pair away from the support member and against the borehole wall; a primary driving member; a rocker member pivotally connected intermediate its extremities to the primary driving member; a pair of secondary driving mechanisms coupling the two extremities of the rocker member to different ones of the first and second pad extending means; and means for applying a driving force to the primary driving member.

15. In apparatus for investigating earth formations traversed by a borehole, the combination comprising: an elongated support member adapted for movement through a borehole; a wall-engaging member; means for driving the wall-engaging member away from the support member and against the wall of the borehole; means for providing an indication of the bearing pressure of the wall engaging member on the borehole wall; and means for adjusting the driving force applied to the wall-engaging member thereby to enable regulation of the bearing pressure.

16. In apparatus for investigating earth formations traversed by a borehole, the combination comprising: an elongated support member adapted for movement through a borehole; a wall-engaging member; means for driving the wall-engaging member away from the support member and against the wall of the borehole; means coupled to the driving means for providing an electrical signal representative of the bearing pressure of the wall-engaging member on the borehole wall; and feedback control circuit means responsive to the bearing pressure signal for adjusting the driving force applied to the wall-engaging member for automatically regulating the bearing pressure of the wall-engaging member.

17. In apparatus for investigating earth formations traversed by a borehole, the combination comprising: an elongated support member adapted for movement through a borehole; a wall-engaging member; arm means coupling the wall-engaging member to the support member; means for transmitting a driving force to the arm means for enabling extension thereof; a base member; spring means acting between the base member and the force transmitting means for applying a driving force to such transmitting means; means for adjusting the position of the base member; electric motor means for selectively actuating the position adjusting means; means for providing an electrical signal representative of the magnitude of compression of the spring means; and feedback control circuit means responsive to the electrical signal for controlling the electric motor for automatically regulating the compression of the spring means and, hence, the bearing pressure of the wall-engaging member.

18. In an apparatus for investigating earth formations traversed by a borehole, the combination comprising: an elongated support member adapted for longitudinal movement through a borehole; a plurality of wall-engaging members; slide members upon which said wall-engaging members are slidably mounted, said slide members being coupled to said support member and arranged to move longitudinally with respect to said support member and said wall-engaging members; a plurality of arm members coupling different wall-engaging members to the support member; and linkage means connected between said wall-engaging members and said support member, said linkage means being arranged for permitting transverse movement of said wall-engaging members with respect to said support member while preventing longitudinal movement therebetween.

19. The apparatus of claim 18 and further including means for applying separate driving forces to different wall-engaging members for enabling unequal lateral extension of different wall-engaging members.

20. The apparatus of claim 18 wherein said linkage means includes a linkage member which is one-half the length of said arm members and connected to the midpoint of one of said arm members.

21. The apparatus of claim 19 and further including means for adjusting the driving forces applied to the wall-engaging members to automatically regulate the force with which said well-engaging member is driven against a borehole wall.

References Cited

UNITED STATES PATENTS

| 2,313,176 | 3/1943 | Shelby | 73—155 X |
| 2,876,413 | 3/1959 | Saurenman et al. | 324—10 |
| 2,899,633 | 8/1959 | Smith et al. | 324—10 |
| 3,028,542 | 4/1962 | Terry | 324—10 |
| 3,060,373 | 10/1962 | Doll | 324—10 X |
| 3,068,400 | 12/1962 | Castel et al. | 324—10 X |
| 3,167,707 | 1/1965 | Oliver | 324—1 |

FOREIGN PATENTS 556,782   2/1957   Italy.

RUDOLPH V. ROLINEC, *Primary Examiner.*

G. R. STRECKER, *Assistant Examiner.*

U.S. Cl. X.R.

33—205; 73—152; 324—10